Sept. 12, 1933.   R. W. SEXTON   1,926,918
ORNAMENTAL FABRIC AND METHOD OF PRODUCTION
Filed March 3, 1933
Fig. 1,
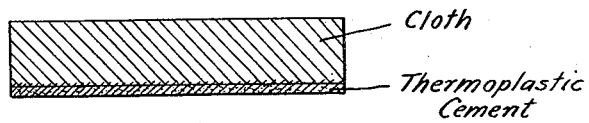
Fig. 2,
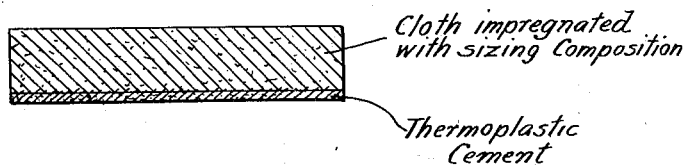
Fig. 3,
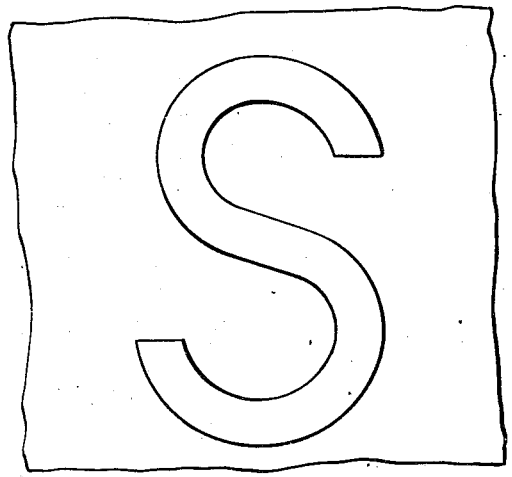
Fig. 4.
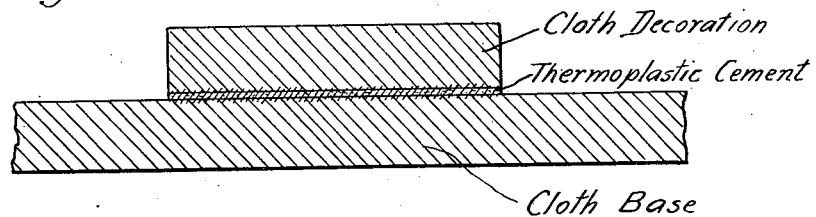
INVENTOR
ROY W. SEXTON
BY
Pennie, Davis, Marvin & Edmonds
ATTORNEYS Patented Sept. 12, 1933

1,926,918

UNITED STATES PATENT OFFICE 1,926,918

ORNAMENTAL FABRIC AND METHOD OF PRODUCTION

Roy W. Sexton, Wytheville, Va.

Application March 3, 1933. Serial No. 659,459

20 Claims. (Cl. 41—34)

This invention relates to the art of uniting articles by means of adhesive compositions and has for an object the production of improved composite articles. Another object of the invention is to provide an improved method for attaching fabric decorations to fabric bases. The invention further contemplates the production of improved articles comprising cloth bases having cloth decorations such, for example, as initials, monograms, designs, motifs, labels, woven and printed names, and the like, attached thereto by means of adhesive compositions. A further object of the invention is to provide cloth decorations having adhering films of thermoplastic compositions by means of which they may be attached to cloth bases to form improved composite articles.

According to the heretofore customary practices, fabric decorations were usually applied to fabric bases by hand embroidery or by hand stitching or machine sewing of ready-made fabric decorations to the fabric bases. Embroidering, stitching and sewing are relatively costly operations because of the time and/or skill required in their performance, and their elimination is desirable.

It has been proposed heretofore to utilize different types of cements in affixing fabric decorations to fabric base material, but these cements for the most part were dependent upon solvent evaporation to attain their adhesive properties. Because of the time factor involved in using these types of cement, as well as other objections, their commercial adoption was not feasible. These types of cement have other undesirable properties, such as susceptibility to water, and poor durability because of tendencies to become oxidized, thereby losing flexibility and adhesion. Also such cements could not withstand repeated launderings and dry cleanings satisfactorily.

It has also been proposed heretofore to utilize themoplastic cements, but the use of such cements for the attachment of fabric decorations to fabric bases has been unsuccessful because of improper methods of application or because of some inherent defects in the cements employed. Thus, according to some of the heretofore customary practices, relatively thick layers of the thermoplastic cements were employed, and the composite products were stiff, and the layers of cement between the fabric layers were brittle. The thermoplastic cements were usually employed in sheet form, a sheet of cement being first attached to the decoration and subsequently to the base, or placed between the decoration and the base and attached to both simultaneously. In the case of cloth decorations having edges tending to become frayed or unravelled, this method of application did not permit sufficient penetration of the cement to bind the edge fibers of the decoration and prevent fraying and unravelling. Certain thermoplastic cements of the rubber base type lose their adhesive properties through oxidation. Oxidation of such cements also causes brittleness and poor durability.

According to the present invention, a thermoplastic cement is applied in the form of a relatively thin film to a surface of a fabric layer to which another layer is to be united. The cement employed is preferably one which is soft and pliable in sheet form, and the thickness of the film is preferably such that its resistance to bending is negligible. According to a preferred method of the invention, the cement is applied to a surface of the decoration in the form of a solution capable of penetrating the fabric sufficiently to form bonds between adjacent fibers. In the production of articles which may be subjected to laundering or dry cleaning operations, I prefer to employ cements capable of resisting the action of the cleansing agents employed in those operations. Cement compositions comprising cellulose esters are particularly suitable for use in carrying out the method of the invention and in forming the products and articles of the invention.

The cement-coated products of the invention may be coated with sizing compositions which prevent breaking down of the surface material and prevent drawing of the cement to the surface of the fabric and/or which facilitate ironing by preventing sticking.

In practicing the invention, a coating of a solution of a suitable thermoplastic cement may be applied to a fabric in sheet form, or as cut out decorations, and dried to form a substantially continuous thin film, and the coated fabric may be applied to a fabric base by means of heat and pressure.

In carrying out the invention, a film of thermoplastic cement may be superposed on one side of the fabric decoration, or, more preferably in large scale production, a fabric sheet from which the decorations are subsequently cut, by any means known in the coating art, as by spraying, roller coating, or knife coating.

The preferred thermoplastic cements comprise cellulose nitrate and a thermoplastic resin compatible therewith. As will be understood by those skilled in the art, the cellulose nitrate and resin are dissolved in solvents so that uniform films may be deposited on the fabrics, but the solvents volatilize and do not play any part in the properties of the films thereafter. In the production of the cements, the polyhydric alcohol-polybasic acid synthetic resins are preferably employed, but other thermoplastic resins compatible with cellulose nitrate may be used, as for example, vinyl resins (acetate chloride or mixed acetate chloride), certain phenol-formaldehyde resins and toluene sulfonamide-formaldehyde resins. The polyhydric alcohol-polybasic acid synthetic resins in general are suitable. They include the gylcerol phthalates, ethylene glycol phthalates, diethylene glycol phthalates, and other polyhydric alcohol-polybasic acid synthetic resins, such as are well known to the art, either modified or not. It is preferred to employ non-drying vegetable oil modified polyhydric alcohol-polybasic acid synthetic resins, and such resins may be modified by castor oil, cocoanut oil, cottonseed oil, hydrogenated cottonseed oil, and similar non-drying vegetable oils, as will occur to those skilled in the art. The drying oil modified polyhydric alcohol-polybasic acid resins may be used but are not preferred, as a cement based on this type of resin tends to lose some of its elasticity and flexibility and to become brittle due to gradual oxidation of the oil ingredient. Alcohol modified resins of this type are entirely suitable. Thus, for example, butyl alcohol modified polyhydric alcohol-polybasic acid resins have been found satisfactory.

The cellulose nitrate employed may be widely varied, from cellulose nitrate having a viscosity of well below 4 seconds to cellulose nitrate having a viscosity of 80 seconds, or above. The upper limit of the viscosity characteristic is dependent only upon the practical workability of the solution. The nitrogen content of the cellulose nitrate may vary between 10.0 and 12.2%, which includes practically all available lacquer cellulose nitrates.

The following examples illustrate formulas of thermoplastic cements which have been found particularly suited for use in the present invention:

*Example 1*

|  | Per cent |
|---|---|
| Cellulose nitrate (viscosity 6-10 sec.) | 2.8 |
| Cellulose nitrate (viscosity approx. ½ sec.) | 5.4 |
| Denatured alcohol | 10.0 |
| Toluol | 29.0 |
| Ethyl acetate | 33.0 |
| Dibutyl phthalate | 6.4 |
| "Synthetic" resin | 13.4 |
|  | 100.0 |

The viscosity of the cellulose nitrates given above and mentioned elsewhere in this specification is determined according to the method outlined in the A. S. T. M. Tentative Specifications and Tests for Soluble Nitrocellulose, Designation D—301—30T, Formula A.

The nitrogen contents of the cellulose nitrates noted in this example are from 11.8 to 12.1%.

*Example 2*

|  | Per cent |
|---|---|
| Cellulose nitrate (viscosity 80 sec.) | 11.3 |
| Denatured alcohol | 8.6 |
| Dibutyl phthalate | 13.5 |
| Toluene | 16.0 |
| Ethyl acetate | 19.9 |
| "Synthetic" resin | 30.7 |
|  | 100.0 |

The nitrogen content of the cellulose nitrate in this example is 11.4 to 11.6%.

The "synthetic" resin in Examples 1 and 2 is a reaction product of

|  | Per cent |
|---|---|
| Phthalic anhydride | 45.8 |
| Glycerol | 28.8 |
| Castor oil | 25.4 |
|  | 100.0 |

This resin is prepared by charging the ingredients into an aluminum kettle fitted with a mechanical stirring device and a thermometer. The batch is heated up to 225° C. in thirty minutes and held at this temperature until an acid number of 15—15 is reached, stirring being maintained throughout the run. The heating cycle is about 4½ hours.

A thermoplastic cement is applied to the fabric sheet or decoration, preferably by knife coating or roller coating and the volatile solvents are permitted to completely evaporate. Drying at room temperature for periods of from 3–20 minutes usually suffices, although a short force dry at low temperatures is sometimes preferable.

The fabric sheet or decoration is now finished, insofar as coating is concerned, where the decoration is to be applied to a fabric base to produce an article which is not to be subjected to laundering, for example, as in the case of pennants. Where an article to be laundered is desired, subsequent treatment of the fabric sheet or initial is desirable.

If the finished article is to be laundered repeatedly, it has been found preferable, in order to obtain the best results, to treat the fabric or decoration either before or after coating with the thermoplastic adhesive with a size composition on the opposite face. A size composition is employed which is designed primarily to prevent breaking down of the surface of the material and to fill the pores between the threads, so that when heat is applied during normal laundering operations, the thermoplastic cement may not be drawn to the surface of the fabric, thus causing substantial loss in adhesion and possible discoloration.

The particular size composition employed may be varied considerably, although it will be understood that a composition should be selected that will not be deleteriously affected by laundering. The following example (Example 3) illustrates a highly suitable size composition that does not substantially alter the appearance or "hand" of the fabric. This composition may be applied to the fabric by means of a doctor knife or other means known in the coating art:

*Example 3*

|  | Per cent |
|---|---|
| Cellulose nitrate | 17.5 |
| Ethyl acetate | 16.3 |
| Denatured alcohol | 24.5 |
| Dibutyl phthalate | 6.0 |
| High melting paraffin wax | 4.0 |
| Paraffin oil | 3.0 |
| Toluol | 28.7 |
|  | 100.0 |

The above size composition is sufficiently thin to partially penetrate the fabric and thus accomplish the objects set forth above. This composition comprises essentially cellulose nitrate, a plasticizer, and a wax, but it will be apparent to those skilled in the art that the invention is by no means limited to this particular type of size composition.

In some instances it is preferable to apply over a size composition such as disclosed above a second size composition comprising essentially wax. The following example illustrates a suitable composition of this type:

*Example 4*

Starch sizing _____ 6 ounces
Paraffin wax _____ 1 ounce
Water _____ 3 pints

This size composition should be applied to the fabric while hot enough to maintain even distribution of the wax.

The use of the size coats described above, while optional, is quite desirable where the article is to be laundered, because it not only affords the desirable properties mentioned above, but also provides a top surface more suited to normal ironing operations, in that sticking tendencies are eliminated.

When a fabric sheet has been coated with thermoplastic adhesive and, if desired, with one or both of the size coats above described, it may be united by heat and pressure to another fabric sheet or cut up into desirable decorations, or it may be stored in rolls for future use. The cutting operation for producing decorations may be performed by commercial cutting or stamping machines. The cut-out decorations may be applied immediately to the desired fabric base, or they may be attached lightly by pressure to a temporary fabric base, such as crinoline, and placed in a suitable wrapper for distribution and sale directly to the consumer. The ease and simplicity of permanent application to base fabrics make the decorations of the present invention of general utility, even to those unskilled in the art.

The affixing of a decoration may be carried out by using an ordinary household flat iron. The base fabric is ironed out at the position where the decoration is to be placed. For this purpose the iron should be used at low heat for shear materials, intermediate heat for materials such as sheets and face towels, and higher heat for heavier materials such as bath towels, bathing suits, sweaters, and the like. This will be obvious to those possessing even the most indifferent skill in the art.

The decoration is now placed in position and preferably over the face of it is placed a thin cloth, or the like. The iron is then placed on the decoration and held for a period of about 3 to 7 seconds. The material is then turned over with the decoration face down and the iron placed on the back of the material and pressed down for about 5 to 20 seconds. A variance in the time of ironing according to the weight of the material used will obviously be made. A temperature of 130–150° C. is usually preferred, and the article should be allowed to cool before handling.

Where application of the decoration is being made to fabrics which are filled and stiffened by their manufacturing process, it is desirable to launder such fabrics before application of the decoration in order to get more permanent anchorage. In the event that any portion of the design should not be securely anchored during application, it will be automatically reanchored from the heat of the iron in subsequent launderings until a permanent and firm anchorage is secured.

In affixing the decoration to the fabric base, pressures on the order of from 2–3 pounds up to approximately 15–20 pounds per square inch, ordinarily secured by human force exerted on an ordinary flat iron, suffice, but higher pressures, for example, 500 pounds per square inch, and up, as obtained from suitable machinery may likewise be used advantageously.

The temperature of application obviously may be varied over a considerable range, depending somewhat upon the particular type of thermoplastic cement employed, but it is preferred not to go much over 150° C., at least not for more than a momentary heating, since some decomposition of the nitrocellulose may take place at higher temperatures. As to the lower limit of the temperature, it is preferable to so design the thermoplastic cement that there will be no undesirable stickiness at temperatures which may be normally encountered during shipping, and storage, so that usually a temperature of 40—50° C. at the lowest is desirable to provide a suitable bond. In particular instances the thermoplastic adhesive may be so designed that normal room temperatures permit the attainment of such a bond, provided higher pressures are used.

In preparing the thermoplastic adhesive it is preferred that its viscosity be so adjusted as to obtain a uniform film on the surface of the fabric with slight impregnation, as a considerable degree of impregnation will materially stiffen and perhaps discolor the fabric. A slight penetration, however, is essential in order that the superior adhesion characterizing articles according to the present invention may be obtained.

The thermoplastc adhesive not only serves to anchor the decoration to the fabric base, but also serves as a connecting link between the fibers of the decoration, thereby preventing the decorations from unravelling after they have been cut out.

The present invention is designed for the application of all types of fabric to a fabric base and is particularly suitable for the affixing of cloth decorations such as initials, monograms, patterns, designs, motifs, printed and/or woven names and labels to fabric bases such as are used in the manufacture of clothing, millinery, and accessories. The term "fabric" as used throughout the specification and in the claims is intended to include all fabric materials whether woven, knitted, felted, or compressed.

The accompanying drawing illustrates several products of my invention. Fig. 1 shows an exaggerated section of a layer or sheet of untreated cloth provided with an adhering layer or film of thermoplastic cement with the cement penetrating the cloth to a slight extent. Fig. 2 shows a similar section of a layer or sheet of cloth impregnated with a sizing composition. Fig. 3 is a plan view of cloth base having a decoration in the form of an initial or letter attached thereto by means of thermoplastic cement. Fig. 4 is an exaggerated section of a fragment of the article shown in Fig. 3, the letter or initial, comprising a layer or sheet of cloth provided with a layer or film of thermoplastic cement, having been attached to the cloth base through the application of heat and pressure. The cement penetrates the cloth of the letter or initial and the base to a slight extent.

The present invention provides a very economical and simplified method for securing decorations to fabric bases. It will be apparent that the ordinary housewife can readily apply decorations prepared in accordance with this invention, to fabric bases. Furthermore, the decorations are firmly and permanently anchored to the fabric base and the adhesive film is waterproof so that the finished article will stand repeated launderings without loosening the decorations, and furthermore, dry cleaning may be employed. The waterproof size compositions also aid in resisting deterioration of the decorations in laundering and cleaning.

The appearance and "hand" of the finished article is substantially unchanged, since the adhesive is in itself flexible and does not impregnate to any considerable extent the fabric material to cause any change in its natural properties. Furthermore, by employing the type of thermoplastic cement herein disclosed, the cement film has no appreciable tendency to harden and stiffen after long use and, as a result the finished article is as satisfactory at all times as when the decoration is first applied to the fabric base.

As many apparently widely different embodiments of this invention may be made without departing from the spirit and scope thereof, it is to be understood that the invention is not limited to the specific embodiments thereof except as defined in the appended claims.

I claim:—

1. The method of uniting cloth layers or sheets which comprises applying to a surface of one layer or sheet a thin film of cement comprising cellulose nitrate and a thermoplastic resin compatible therewith, placing another layer or sheet in contact with the cement film, and pressing at a suitable temperature.

2. A cloth decoration provided with a thin adhering film of thermoplastic cement comprising cellulose nitrate and a thermoplastic resin compatible therewith.

3. A cloth decoration provided on one surface with a thin adhering film of thermoplastic cement and having its opposite surface coated with a size comprising a wax.

4. A cloth decoration provided on one surface with a thin adhering film of thermoplastic cement comprising a cellulose ester and a thermoplastic resin compatible therewith and having its opposite surface coated with a size composition comprising a wax.

5. A cloth decoration provided on one surface with a thin adhering film of thermoplastic cement comprising a cellulose ester and a thermoplastic resin compatible therewith and having its opposite surface coated with a size composition comprising a cellulose ester and a wax.

6. A cloth decoration provided on one surface with a thin adhering film of thermoplastic cement comprising cellulose nitrate and a thermoplastic resin compatible therewith and having its opposite surface coated with a size composition comprising cellulose nitrate and a wax.

7. The method of applying a cloth decoration to a cloth base which comprises providing one surface of the decoration with an adhering film of thermoplastic cement, contacting a surface of the cloth base with the cement film, and pressing the cloth base and decoration together while transmitting heat to the film through the cloth base, thereby to soften the material of the film and cause the softened material to be drawn into the pores of the cloth base.

8. The method of applying a cloth decoration to a cloth base which comprises providing one surface of the decoration with an adhering film of thermoplastic cement, contacting a surface of the cloth base with the cement film, pressing the cloth base and decoration together while transmitting heat to the film through the decoration to soften the material of the film and cause the decoration to become attached to the cloth base, and subsequently pressing the cloth base and decoration together while transmitting heat to the film through the cloth base, thereby to further soften the material of the film and cause the softened material to be drawn into the pores of the cloth base.

9. A cloth decoration having an adhering film of a thermoplastic cement on one surface thereof and having its other surface treated with a size capable of filling the pores of the cloth to the extent of preventing the thermoplastic cement passing through to that surface when subjected to heat and pressure.

10. In the art of preparing decorative cloth articles and the like, the improvement which comprises applying to a surface of a cloth sheet a thin film or coating of a solution of a thermoplastic cement comprising a cellulose derivative and a thermoplastic resin compatible therewith, the viscosity of the solution being such as to permit sufficient penetration to provide bonds between adjacent fibers of the cloth when the solvent has evaporated, and applying a size composition to the other surface of the cloth sheet to fill the pores, thereby to inhibit fraying of the edge portions of the cloth after cutting and to prevent drawing of the thermoplastic cement through the cloth under the influence of heat.

11. A cloth decoration having an adhering film of thermoplastic cement comprising cellulose nitrate and a polyhydric alcohol-polybasic acid synthetic resin.

12. A cloth decoration having an adhering film of thermoplastic cement comprising cellulose nitrate and a non-drying vegetable oil modified polyhydric alcohol-polybasic acid synthetic resin.

13. The method of applying a cloth decoration to a cloth base which comprises coating a surface of a cloth layer or sheet with a thermoplastic cement comprising a cellulose derivative and a thermoplastic resin compatible therewith, cutting a decorative design out of said layer or sheet, and applying said design to the cloth base with the cement-coated surface against said cloth base by means of heat and pressure.

14. The method of applying a cloth decoration to a cloth base which comprises applying to a surface of a cloth layer or sheet a thin film of a thermoplastic cement comprising a synthetic resin, said cement being flexible and non-tacky at normal temperatures, cutting a decorative design out of said layer or sheet, and applying said design to the cloth base with the cement coated-surface against said cloth base by means of heat and pressure.

15. An article comprising a cloth base having a cloth decoration united thereto by means of a thermoplastic cement comprising a cellulose derivative and a thermoplastic resin compatible therewith, the cement penetrating both the cloth base and the cloth decoration and forming bonds between adjacent fibers thereof.

16. An article comprising a cloth base having a cloth decoration united thereto by means of a thermoplastic cement comprising a synthetic resin, the cement penetrating both the cloth base and the cloth decoration and forming bonds between adjacent fibers thereof.

17. A cloth decoration having a surface provided with a film of thermoplastic cement comprising a cellulose derivative and a thermoplastic resin copatible therewith and capable of softening sufficiently under the influence of heat at normal ironing temperatures to penetrate the material of a cloth base to which it may be applied under the influence of normal ironing pressures.

18. A cloth decoration having a surface provided with a film of thermoplastic cement comprising a synthetic resin and capable of softening sufficiently under the influence of heat at normal ironing temperatures to penetrate the material of a cloth base to which it may be applied under the influence of normal ironing pressures.

19. A decorative article formed from porous flexible sheet material and having a surface provided with a thin film of thermoplastic cement comprising a cellulose derivative and a thermoplastic resin compatible therewith.

20. A decorative article formed from porous flexible sheet material and having a surface provided with a thin film of thermoplastic cement comprising cellulose nitrate and a thermoplastic resin compatible therewith.

ROY W. SEXTON.